United States Patent [19]

Ross et al.

[11] 3,887,999

[45] June 10, 1975

[54] METHOD AND APPARATUS FOR VARYING THE RELATIVE LENGTH OF A PLURALITY OF LEADS AND FOR PERFORMING WORK OPERATIONS ON THE ENDS OF LEADS OF DIFFERING RELATIVE LENGTH

[75] Inventors: Milton Dean Ross; Kenneth Foster Folk; Walter Clifton Shatto, Jr., all of Harrisburg, Pa.

[73] Assignee: William J. Keating, Esq., Harrisburg, Pa.

[22] Filed: Dec. 12, 1973

[21] Appl. No.: 424,129

Related U.S. Application Data

[63] Continuation-in-part of Ser. No. 389,924, Aug. 20, 1973.

[52] U.S. Cl. ............ 29/628; 29/203 DT; 29/203 P; 29/630 A

[51] Int. Cl. ............ H01r 43/00

[58] Field of Search ..... 29/203 D, 203 DT, 203 DS, 29/203 P, 203 J, 203 MW, 407, 461, 628, 629, 630 B; 140/147; 72/404; 113/119

[56] References Cited

UNITED STATES PATENTS

| | | | |
|---|---|---|---|
| 3,195,584 | 7/1965 | Zimmerman et al. | 140/147 |
| 3,283,987 | 11/1966 | Kauffman | 29/630 B |
| 3,450,829 | 6/1969 | Paul | 29/628 |
| 3,687,172 | 8/1972 | Suverkropp | 53/21 R |
| 3,708,853 | 1/1973 | Humen et al. | 29/203 D |
| 3,747,186 | 7/1973 | Cervenka et al. | 29/203 D |
| 3,765,073 | 10/1973 | Burns | 29/203 D |

FOREIGN PATENTS OR APPLICATIONS

| | | | |
|---|---|---|---|
| 1,078,548 | 8/1967 | United Kingdom | 140/147 |

OTHER PUBLICATIONS

IBM Technical Disclosure Bulletin, Vol. 6, No. 4, pp. 28–29.

*Primary Examiner*—C. W. Lanham
*Assistant Examiner*—James R. Duzan
*Attorney, Agent, or Firm*—William J. Keating; Jay L. Seitchik; F. W. Raring

[57] ABSTRACT

A method and apparatus for varying the relative length of a plurality of leads. A template is provided having a plurality of spaced apart grooves of differing overall lengths. Portions of the plurality of leads are disposed in the grooves to extend from one end of the groove to the other end. After said portions of the leads have been positioned in the grooves, various work operations can be performed on the end portions of the leads which extend beyond one end of the template, such as, for example, trimming the ends and affixing terminals to the ends of the leads. The drawings disclose three different embodiments. In the first embodiment a template is disclosed having a primary groove and a plurality of secondary grooves which emanate from the primary groove, the primary groove receiving one end of a multi-lead cable from which free end lead sections of a plurality of leads extend. The secondary grooves are of differing overall lengths and after the free end lead sections of the leads have been disposed within the secondary grooves they are then trimmed in a common plane to differing lengths. A secondary embodiment is disclosed for working with a plurality of leads mounted upon their own individual supply spools. In this embodiment the template has a plurality of grooves which extend from one end to the other, some of the grooves being of longer overall length than others. The third embodiment disclosed in the drawings is designed for use with a workpiece having leads extending away from the workpiece, the portions of the leads adjacent the workpiece being in a fixed spatial relationship. This form of the apparatus may also be utilized to simultaneously affix a plurality of terminals or the like to leads which extend from a workpiece when the leads are initially of differing overall length.

27 Claims, 16 Drawing Figures

METHOD AND APPARATUS FOR VARYING THE RELATIVE LENGTH OF A PLURALITY OF LEADS AND FOR PERFORMING WORK OPERATIONS ON THE ENDS OF LEADS OF DIFFERING RELATIVE LENGTH

CROSS REFERENCE TO RELATED APPLICATION

This application is a continuation-in-part to U.S. Application Ser. No. 389,924 filed Aug. 20, 1973 and entitled "Method And Apparatus For Positioning Leading Portions Of Individual Wires Of A Plurality Of Wires In Spaced Apart Relationships With Respect To Each Other And A Template Utilized In Accomplishing The Same", and also is related to U.S. application Ser. No. 424,133 filed concurrently with this application and entitled "Method And Apparatus For Varying The Relative Length Of A Plurality Of Leads By Forming Bights In Selected Leads", both of these related applications being assigned to the same assignee as this application.

FIELD OF THE INVENTION

The present invention relates generally to a method and apparatus for varying the length of a plurality of leads with respect to each other and also to a method and apparatus for performing work operations simultaneously upon the ends of a plurality of leads of differing overall lengths.

BACKGROUND OF THE INVENTION

Prior to the development of the method and apparatus shown in co-pending U.S. Application Ser. No. 389,924 it was not practical to perform simultaneous work operations upon the ends of a plurality of leads which were freely movable relative to each other. Thus, for example, it was not possible to automatically apply terminals or the like to the free end lead sections of a plurality of leads which emanated from an end of a multi-lead cable. Similarly, it was not possible to perform simultaneous work operations upon the ends of the leads which emanated from a common workpiece where the ends of the leads were freely movable relative to each other. Thus, if it were necessary to apply terminals to these leads it was necessary to individually place a terminal on each of the leads. If it were also necessary to shorten some of the leads, this was also done individually.

In U.S. application Ser. No. 389,924 a method and apparatus is disclosed which positions a plurality of associated leads in spaced apart relationship with respect to each other, this positioning being done by an apparatus which includes a template having a plurality of spaced apart grooves which emanate from a primary groove, the spaced apart grooves being capable of receiving only a single lead and the primary groove being capable of receiving the end of a multi-lead cable from which a plurality of free end lead sections emanate. According to the aforesaid application, the end of the multi-lead cable is placed in the primary groove with the free end section overlying the plurality of spaced apart grooves, and then portions of the free end lead sections are formed into the plurality of grooves by an oscillating roller or the like which is biased toward the template and moved from the primary groove toward that end of the plurality of grooves which is spaced away from the primary groove. Once portions of the free end le[illegible] sections have been forced into the plurality of grooves the free end portions of the leads which extend beyond the end of the template are in a fixed oriented location suitable for subsequent machine operation whereby the ends of the free end lead sections may be trimmed and/or a plurality of terminals or the like may be simultaneously applied to the ends of the free end section.

When utilizing the principles of the aforesaid application all of the leads are of approximately the same length after the subsequent machine operations have been performed. However, in some applications it is necessary to simultaneously vary the length of individual leads which are normally movable with respect to each other before subsequent work operations can be performed upon the ends of the leads. For example, when applying terminals to the ends of the leads which extend outwardly from a coil it may be necessary to have one lead of slightly shorter length than the other lead. It is not possible with the apparatus as shown in the aforesaid patent application to automatically vary the length of the leads and to simultaneously apply terminals or the like to the ends of the leads which are of different lengths.

OBJECTS AND SUMMARY OF THE INVENTION

It is a principle object of this invention to provide a method and apparatus for varying the relative length of a plurality of leads which extend away from a portion of the leads which are being held in known fixed relationships to each other so that subsequent automatic operations can be performed on the ends of the leads at a location spaced away from that portion of the leads which are being held.

More specifically, it is an object of the present invention to hold portions of a plurality of leads in fixed relationship to each other adjacent a first portion of a plurality of grooves in a template, to position portions of the plurality of leads which extend away from the portions that are being held in the grooves, and to vary the relative lengths of the portions which extend away from the held portions while holding the leads and maintaining at least a portion of the leads in said grooves.

It is a further object of the invention to vary the relative length of a plurality of leads by holding portions of the leads in fixed relationship to each other and adjacent one end of a plurality of grooves of differing overall length, by positioning other portions of the plurality of leads into said grooves, and by trimming the leads in a common plane adjacent to the other end of the grooves whereby the overall length of the leads between the held portions and the trimmed portions are varied.

It is another object of the present invention to vary the relative length of a plurality of leads having free end lead sections which extend away from an end of a multi-lead cable by holding the end of a multi-lead cable in a primary groove on a template with the free end lead sections overlying a plurality of secondary grooves of varying lengths, the secondary grooves emanating from the primary groove, by positioning the free end sections into the plurality of grooves, and by trimming the ends of the free end sections adjacent the other end of the secondary grooves to vary the relative length of the free end sections.

It is another object of the present invention to assemble a plurality of leads of differing overall lengths from leads which are initially supported on their own individual supply spools. This is accomplished by initially moving the ends of the leads away from their supply spools across a template having a plurality of grooves of differing overall length, by holding the ends of the leads adjacent the end of the template remote from the supply spools with portions of the leads overlying the template, and by rolling said portions of the leads into the plurality of grooves, and by trimming the ends of the leads in a common plane adjacent the end of the template which is disposed closer to said supply spools.

It is another object of the present invention to vary the relative length of a plurality of leads which are secured in fixed spatial relationship to each other at one end to a common workpiece by holding the workpiece adjacent one end of a template with the ends of the leads that are secured to the workpiece being disposed in an end of a plurality of grooves which extend from one end of the template to the other, the grooves being of differing overall length, by positioning other portions of the leads in said plurality of spaced apart grooves, and by trimming the ends of the leads which project beyond the other end of the template in a common plane whereby the overall length of the leads are varied.

It is also an object of the present invention to provide a method and apparatus for simultaneously affixing terminals or the like to a plurality of leads of differing length which extend away from a common workpiece by holding the workpiece adjacent one end of a template with an initial end portion of each of the leads being disposed within an end portion of a plurality of grooves which extend from one end of the template to the other, the grooves being of differing overall length and each groove being of a length which is a fixed length less than that of the lead which is to be associated with the groove, by positioning the leads into their associated groove with free end portions of the leads extending beyond the other end of the template, the free end portions being of substantially the same length, and by simultaneously applying terminals or the like to the free end portions of the leads.

It is a still further object of the present invention to provide various apparatus for varying the length of a plurality of leads, one of the apparatus being sutiable for varying the length of a plurality of free end lead sections which extend from one end of a multi-lead cable, another apparatus being suitable for varrying the length of a plurality of leads which extend from a common workpiece, the portions of the leads which are secured to the workpiece being initially held in fixed spatial relationship to each other, and another apparatus being suitable for assembling a plurality of leads from supply spools, the plurality of assembled leads being of differing overall lengths.

It is an additional object of the present invention to provide an apparatus for simultaneously affixing terminals or the like to the ends of a plurality of leads which extend away from a common workpiece, the leads initially being of differing overall length.

These and other objects and advantages of this invention are accomplished by providing a template having a plurality of spaced apart grooves of differing overall length formed in a surface of the template, each of the spaced apart grooves being capable of receiving only a single lead, and by disposing the leads whose lengths are to be varied relative to each other within the grooves by moving a roller or the like across the template from one end of the grooves to the other to position the leads into the template. In a first embodiment shown in the accompanying drawings an apparatus is disclosed which is suitable for varying the lengths of the free end lead sections which extend outwardly from an end of a multi-lead cable. The template of this embodiment has, in addition to the plurality of grooves of varying length, a primary groove disposed at one end of the plurality of grooves. Means are provided to hold one end of a multi-lead cable in said primary groove with free end lead sections initially overlying the spaced apart grooves, and a roller is moved from the primary groove toward the end of the spaced apart grooves disposed away from the primary groove to progressively force the free end lead sections into the spaced apart grooves. After the free end lead sections have been disposed in the spaced apart groves, the ends of the free end lead sections are sheared in a common plane whereby the overall length of the free end lead sections are varied, and then terminals or the like may be applied to the terminal end portions of the leads. In a second embodiment shown in the accompanying drawings an apparatus is disclosed which is suitable for assembling a plurality of leads of varying lengths from supply spools, the apparatus including structure operable to move the ends of the leads which project away from the supply spools across the template, means to roll the leads into grooves of varying lengths on the template, and means to shear the leads adjacent that end of the template which is disposed closest to the supply spools. In a third embodiment shown in the accompanying drawings an apparatus is disclosed which is either suitable for varying the lengths of a plurality of leads which extend away from a common workpiece, the portions of the leads secured to the workpiece being initially disposed in a predetermined spatial arrangement, or for simultaneously applying a plurality of terminals or the like to the ends of leads which extend away from a common workpiece, the leads initially being of varying length and having a fixed incremental length greater than the lengths of the grooves on a template with which they are to be associated.

These and other objects and features will be apparent to those skilled in the art after a consideration of the following detailed description taken in conjunction with the accompanying drawings in which preferred forms of this invention are shown.

DESCRIPTION OF THE DRAWINGS

FIG. 3 is also a somewhat schematic view illustrating the manner in which terminals may be applied to the ends of leads.

IN GENERAL

Figures 1, 1A:
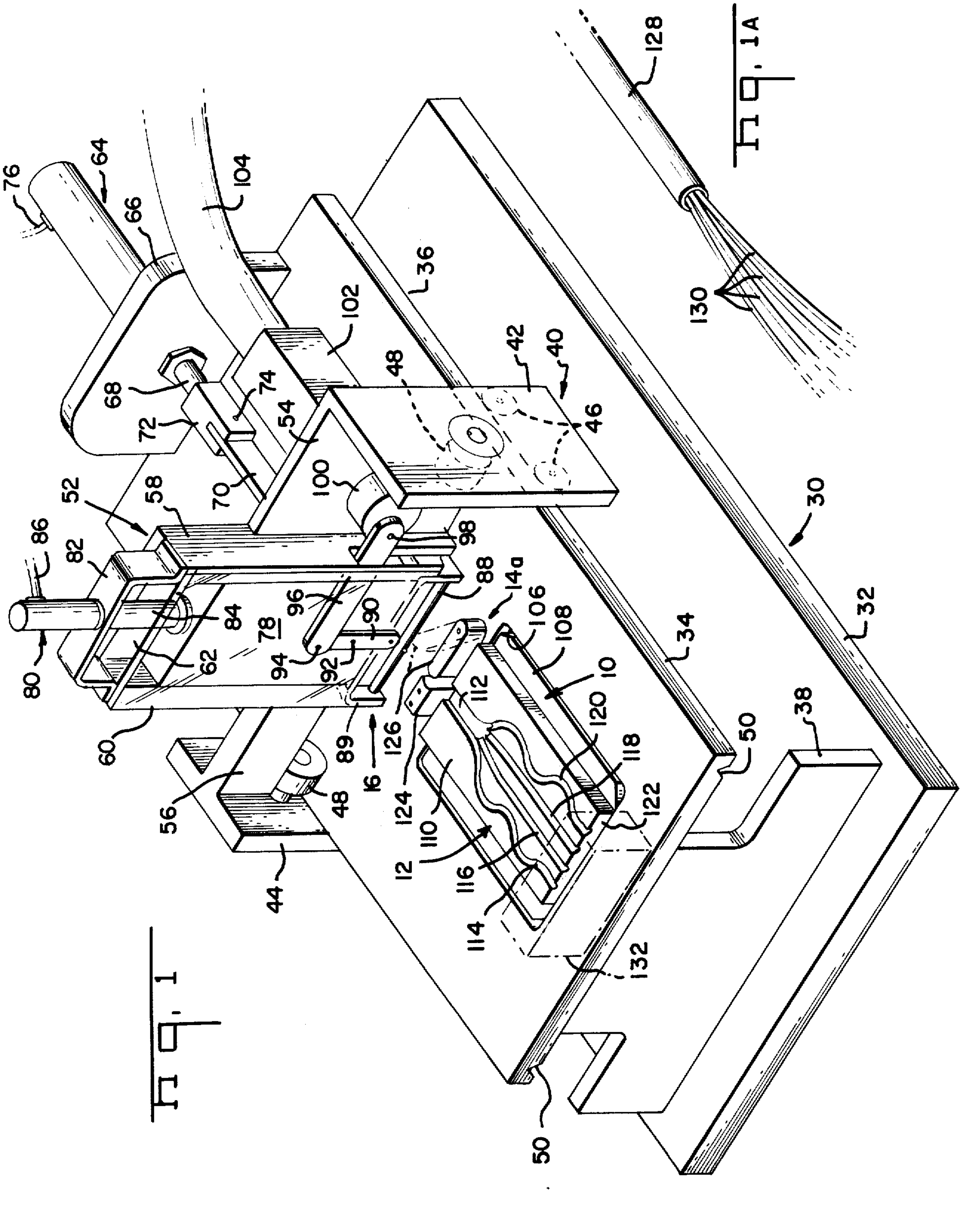
FIG. 1 is a perspective view of an apparatus suitable for varying the relative length of free end lead sections which extend outwardly from one end of a multi-lead cable, portions of the apparatus being omitted for purposes of clarity.
FIG. 1A is a perspective view of a multi-lead cable having free end lead sections whose lengths may be varied by the apparatus shown in FIG. 1.

In each of the embodiments shown in the drawings template means indicated generally at 10 is provided, the template means having a plurality of spaced apart grooves, indicated generally at 12, the grooves being of differing overall lengths. Holding means (indicated generally at 14*a* in FIG. 1, 14*b* in FIGS. 4 through 11, and 14*c* in FIGS. 13 and 14) are provided to hold one end of a plurality of leads adjacent one end of a template. Positioning means, indicated generally at 16, are provided which positions leads into the grooves of varying lengths. After the leads have been positioned in the grooves 12, lead trimming means, indicated generally at 18, may be brought into operation to shear the ends of the leads, and terminal applying means, indicated generally at 20, may be employed to affix terminals about the ends of the leads which are of different overall length.

DETAILED DESCRIPTION OF THE FIRST EMBODIMENT

Referring first to FIG. 1, a frame indicated generally at 30 is provided, the frame including a lower support plate 32, and upper plate 34, and spaced apart member 36, 38 which support the upper plate 34 above the lower plate 32.

The positioning means 16 includes an upper carriage assembly, indicated generally at 40, mounted for longitudinal movement along the length of the upper plate 34. To this end it should be noted that the upper carriage assembly 40 includes spaced apart supports 42, 44, each of the supports carrying lower rollers 46 and an upper roller 48. The lower rollers 46 are beveled and engage spaced apart longitudinal tracks 50 formed in the lower surface of the upper plate 34. The upper roller 48 rolls along the upper surface of the plate 34. In addition to the supports 42, 44, the upper carriage assembly includes an intermediate frame indicated generally at 52, the intermediate frame being secured to the supports 42, 44 by members 54, 56 which extend inwardly from the support 42, 44 to the intermediate frame. Each of the members 54, 56 is rigidly secured at its outer end to its associated support 42, 44. The inner end of the members 54, 56 are in turn rigidly secured to spaced apart side rails 58, 60 of the intermediate frame 52. The lower end of the side rails are interconnected to each other in a manner not illustrated in these drawings, and the upper end of the side rails 58, 60 are interconnected to each other by a cross frame member 62. The upper carriage assembly 40 can be reciprocated along the upper plate 32 by means of a cylinder assembly indicated generally at 64. One end of the cylinder assembly is secured to one side of a vertical mounting member 66 whose lower edge is rigidly secured to the upper plate 34. A rod 68 of the cylinder assembly 64 passes through an aperture in the vertical mounting plate 66 and is connected to a link 70 by means of a yoke 72 having pivot pin 74. The other end of the link 70 is interconnected with the intermediate frame 52. It should be appreciated that as fluid is introduced into the cylinder assembly 64 through line 76 that the rod 68 of the cylinder assembly 64 will be extended to the left in FIG. 1 causing the intermediate frame 52 and the rest of the upper carriage assembly 40 to move to the left. Upon retraction of the cylinder assembly 64 it should also be observed that the intermediate frame 52 and the rest of the upper carriage assembly 40 will move to the right. The cylinder assembly 64 can be of a double acting type, or it may be of a single acting type which includes a spring which normally biases the rod 68 to the right hand position as viewed in FIG. 1. The intermediate frame carries between the side rails 58 and 60 a vertically movable slide 78. The slide 78 is caused to be moved upwardly and downwardly by a second cylinder assembly, indicated generally at 80. In this connection it should be noted that one end of the second cylinder assembly is mounted on an intermediate portion of a U-shaped support member 82, the ends of the support member 82 being secured to the spaced apart side rails 58, 60. A rod 84 passes through an aperture in the support member 84, the lower end of the rod being interconnected to the top of slide 78. it should be appreciated that as the cylinder assembly 80 is caused to extend through the introduction of fluid through line 86 that the slide 70 will be moved downwardly. A roller 88 is mounted between the ends of an inverted U-shaped frame member 89 which is in turn mounted on the lower end of the slide 78. It should be noted at this point that the frame member is mounted for oscillatory sideways movement and to this end it should be noted that a portion of the frame member 89 is interconnected to a link 90, an intermediate portion of the link being pivoted about pin 92, and the other end of the link being pivotally secured as at 94 to a second link 96. The other end of the second link 96 is carried by a pivot pin 98 which is eccentrically mounted upon a rotatable member 100. The rotatable member is in turn secured to drive means in the drive housing 102 by a shaft (not shown) which projects through an aperture in the member 54, the drive housing being secured to the sidewall of the member 54 opposite from the side adjacent the rotatable member 100. The drive means in the drive housing 102 is in turn driven through a power line 104.

The template means 10 is mounted within an aperture 106 provided in the upper plate 34, and the template means includes a template support 108 mounted within the aperture 106, the template support 108 in turn supporting a template 110. The template is provided with a primary groove 112 and the plurality of spaced apart grooves 12 are comprised of the spaced apart grooves 114, 116, 118, 120, the plurality of spaced apart grooves emanating from the primary groove 112 and being of differing overall lengths. It should be noted at this point that the two intermediate grooves 116, 118 are generally straight, while the two outer grooves 114, 120 have a generally sinusoidal configuration and are therefore longer than the grooves 116, 118. Also, each of the grooves 114, 116, 118, 120 is capable of receiving only a single lead. The grooves 114, 116, 118, and 120 all terminate adjacent the end 122 of the template. The holding means, indicated generally at 14*a*, includes a fixed member 124 and a pivoted member 126 which may be swung from an open position indicated in broken lines in FIG. 1 to a closed or holding position indicated in full lines. The members 124, 126 are both secured to the upper plate 34.

The apparatus so far described is operable to hold one end 128 of a multi-lead cable (FIG. 1A) in the primary grooves 112 and to position the free end lead sections 130 which extend outwardly from the end 128 of the multi-lead cable into the plurality of spaced apart grooves 114, 116, 118, 120.

Figure 2:
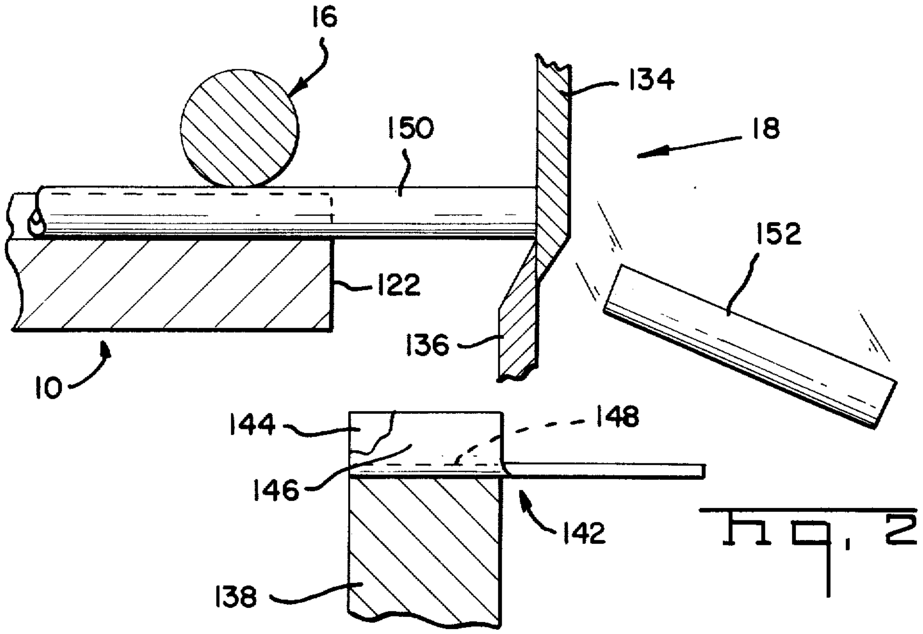
FIG. 2 is a somewhat schematic view illustrating how the ends of the free end lead sections are sheared to cause the sheared free end sections to be of differing overall lengths.

Means are provided on the apparatus of FIG. 1 for shearing the ends of the free end sections 130 after they have been positioned in the plurality of spaced apart grooves and also for applying terminals to the terminal end portions of the leads which remain after shearing. The location of the lead trimming means and the terminal applying means have been indicated in block outline in FIG. 1 at 132. However, the details of this structure have not been shown in FIG. 1 for purposes of clarity. The lead trimming means 18 are shown in FIG. 2, the lead trimming means including an upper vertically movable shear blade 134 and a lower fixed shear blade 136. It should be appreciated that after portions of the free end lead sections have been disposed in the grooves 12, that free end portions of the leads 130 will extend beyond the end 122 of the template 110 with portions extending between the shear blades 134, 136, and that as the upper shear blade moves downwardly the ends of the leads will be sheared. As the shear blades have a straight edge the ends of the leads will be sheared in a common plane. The shears are positioned so that they are parallel to the end 122 of the template and therefore when the ends of the leads are sheared after they have been positioned in the grooves 114, 116, 118, 120 they will be of differing overall lengths.

The terminal applying means 20 are somewhat schematically illustrated in FIG. 3 and include anvil means 138 and upper vertically shiftable crimper means 140. The anvil means 138 (which are generally of the form illustrated in FIG. 4) support a plurality of spaced apart terminals 142, each of the terminals having spaced apart sidewalls 144, 146 which are interconnected by an intermediate bight portion 148. After the leads have been sheared, the terminal end portion 150 of the leads which extend between the end 122 of the template and the sheared end of the leads is moved between the spaced apart sidewalls 144, 146, the sidewalls 144, 146 then being crimped about the terminal end portion 150 as the crimper attains its lowered position shown in FIG. 3. In order to move the terminal end portion 150 between the spaced apart sidewalls 144, 146 the templates support 108 is moved downwardly through the aperture 106 after the ends of the leads have been sheared.

OPERATION OF THE FIRST EMBODIMENT

In operation, the end 128 of the multi-lead cable is initially positioned in the primary groove in the manner shown in co-pending U.S. patent application Ser. No. 389,924. In this connection, it should be noted that before it is positioned in the primary groove 112, the pivoted member 126 is disposed in its dotted line position as shown in FIG. 1 and after the end 128 has been positioned in the primary groove the pivoted member 126 is swung to its full line position, the members 124 and 126 cooperating with each other to hold the cable in the primary groove. The free end lead portions initially extend away from the end 128 and are not within the grooves 114, 116, 118, 120. In order to position the plurality of free end lead sections 130 in the grooves the positioning means 16 is operated in a sequential manner. Thus, the roller 88 is initially positioned over the end 128 of the primary groove and is biased downwardly toward the template 110 by the force applying means or cylinder assembly 80. After the roller has been brought into engagement with the end 128 or the plurality of leads 130 immediately adjacent the ends 128 the cylinder assembly 64 is actuated causing the force applying means or roller 88 to move from one end of the grooves 114, 116, 118, 120 to the other end of the grooves. As the roller is moved from one end to the other it is oscillated through rotation of the rotatable member 100 and the leads are progressively forced into the plurality of spaced apart grooves. After the roller 88 has moved to the end 122 of the template means, it should be noted that free end portions of the leads extend beyond the ends of the template 122. The free end portions include the terminal end portions 150 and that portion 152 (FIG. 2) of the leads which are subsequently severed. The free end portions which extend beyond the end 122 lie between the upper and lower shear blades 134, 136 and as the upper shear blade 134 is moved toward the lower shear blade a portion 152 of the free end portions of the leads will be severed in a common plane parallel to the end 122 of the template 110 leaving a terminal end portion 150 extending beyond the end 122. The lengths of the leads 130 will be of differing overall lengths after shearing. After the leads have been trimmed or sheared by the lead trimming means 134, 136 it is then only necessary to actuate the terminal applying means 20 to apply terminals 142 about the terminal end portions 150 of the leads. To this end, the crimper 140 is moved downwardly, and as the crimper 140 is moved downwardly the template 110 is also moved downwardly placing the terminal end portions 150 between the spaced apart sidewalls 144, 146 of the terminals. As the crimper completes its downward movement the sidewalls 144, 146 will be crimped about the terminal end portions of the leads.

DETAILED DESCRIPTION AND OPERATION OF SECOND EMBODIMENT

Figure 7:
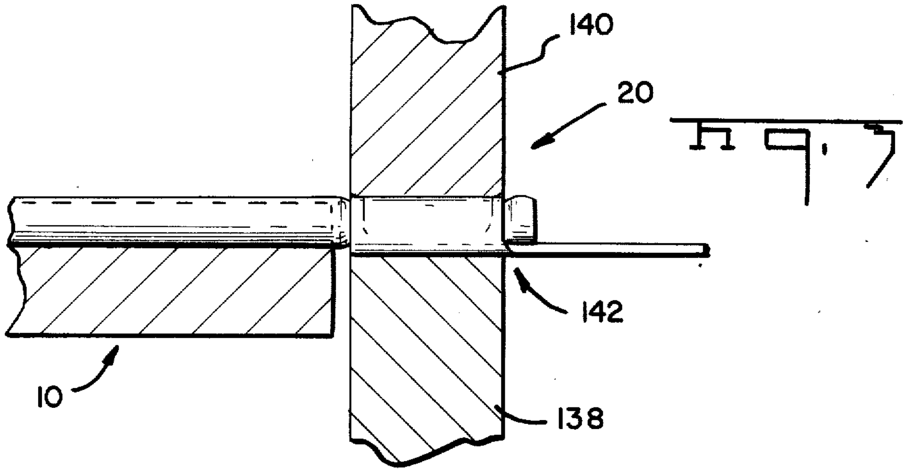
FIGS. 5 through 11 are fragmentary side views of the apparatus shown in FIG. 4 illustrating the sequence of operations which are to be performed when an assembly of leads of differing lengths are to be formed from leads initially supported on their own individual supply spools, FIG. 5 showing the initial disposition of the apparatus, FIG. 6 showing the apparatus after the ends of the leads have been moved across the template, FIG. 7 showing the start of the operation wherein the leads are to be positioned in the grooves in the template, FIG. 8 showing the completion of the positioning of the leads into the grooves in the template, FIG. 9 showing the shearing of the leads adjacent that end of the template which is closest to the supply spool, and FIGS. 10 and 11 showing how terminals may be applied to the ends of the leads.
Figure 4:
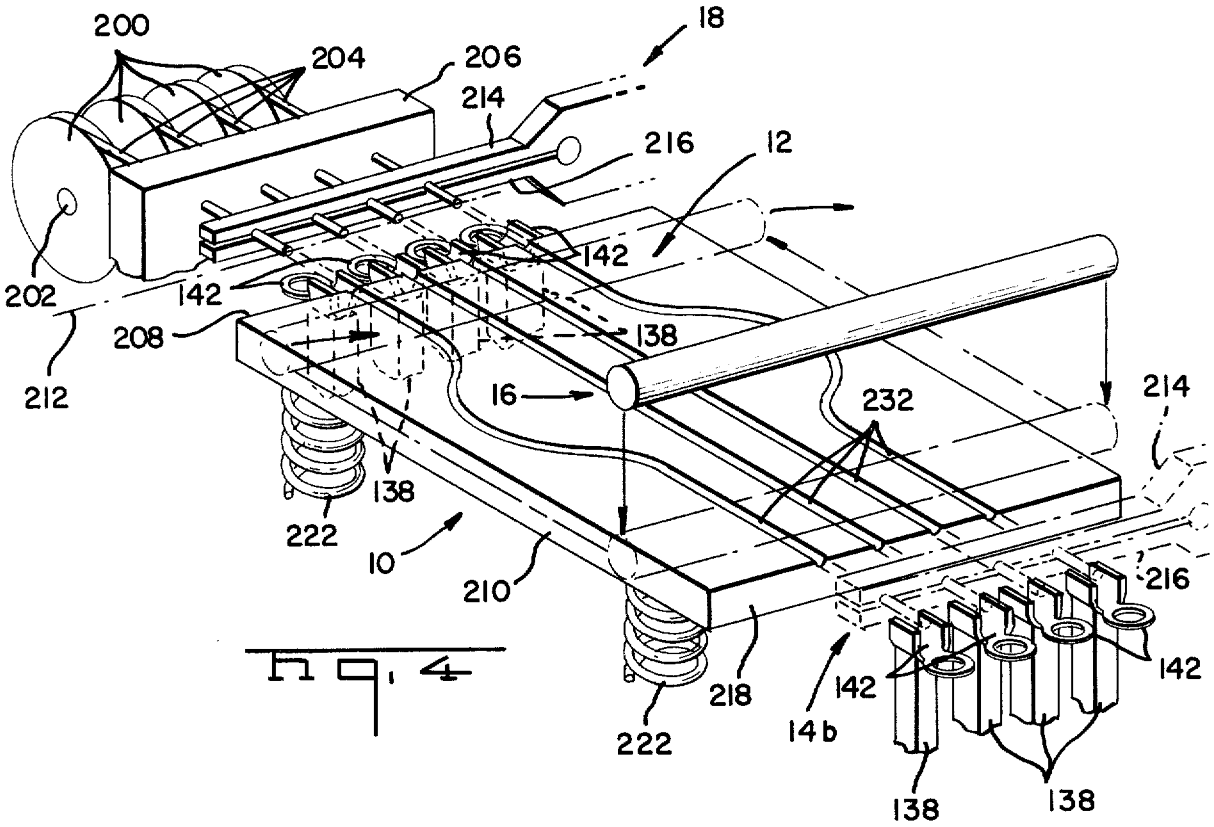
FIG. 4 is a perspective view showing portions of an apparatus which may be utilized to form an assembly of leads of differing overall lengths, wherein each of the leads is initially supported on its own supply spool.
Figure 5:
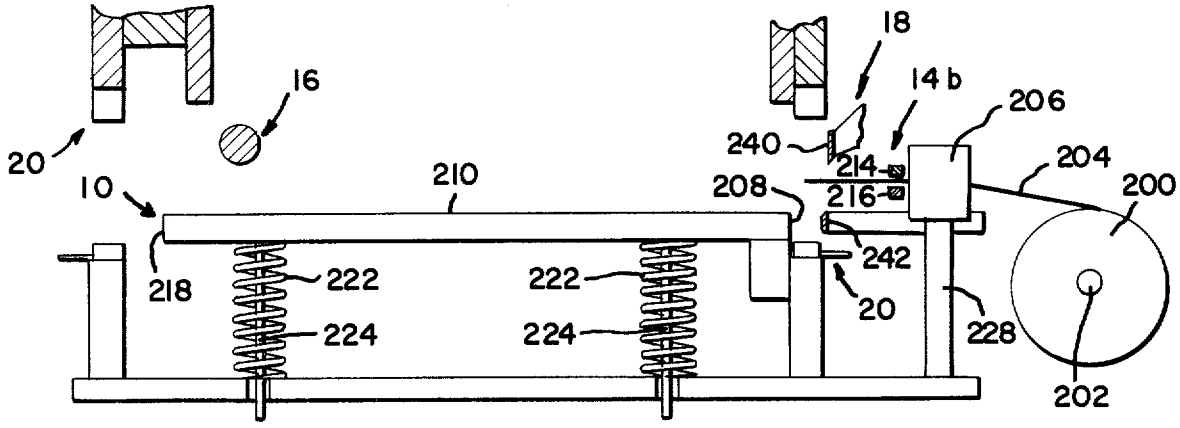
Figure 6:
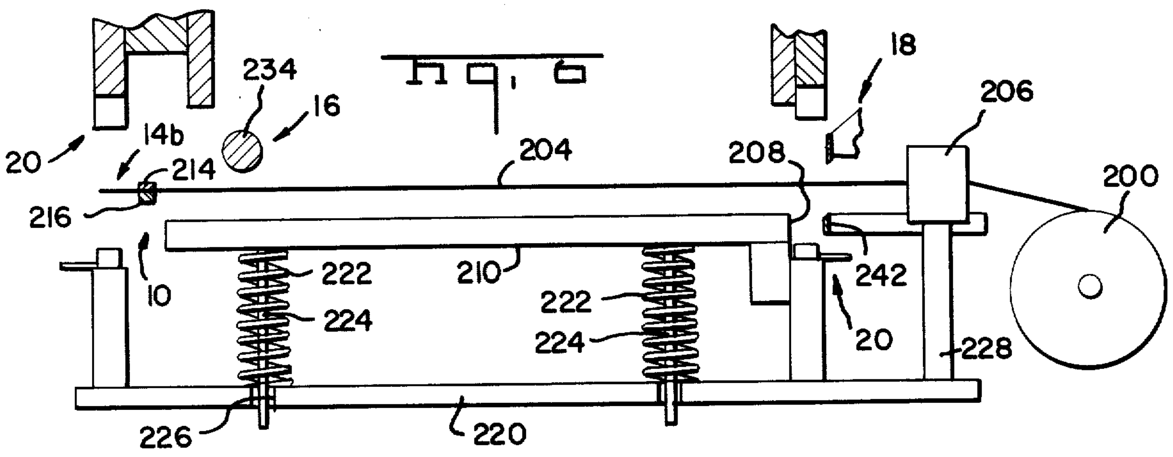
Figure 7:
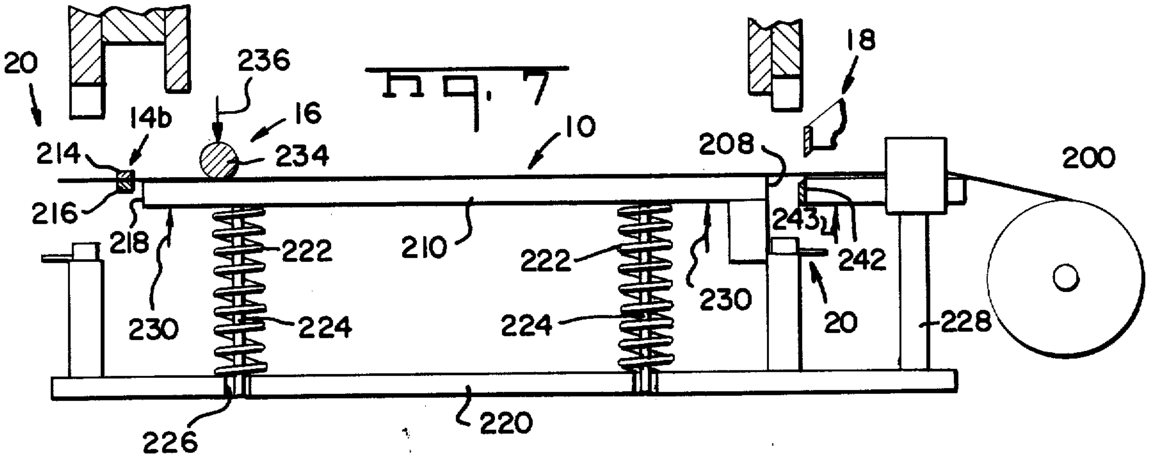
Figure 8:
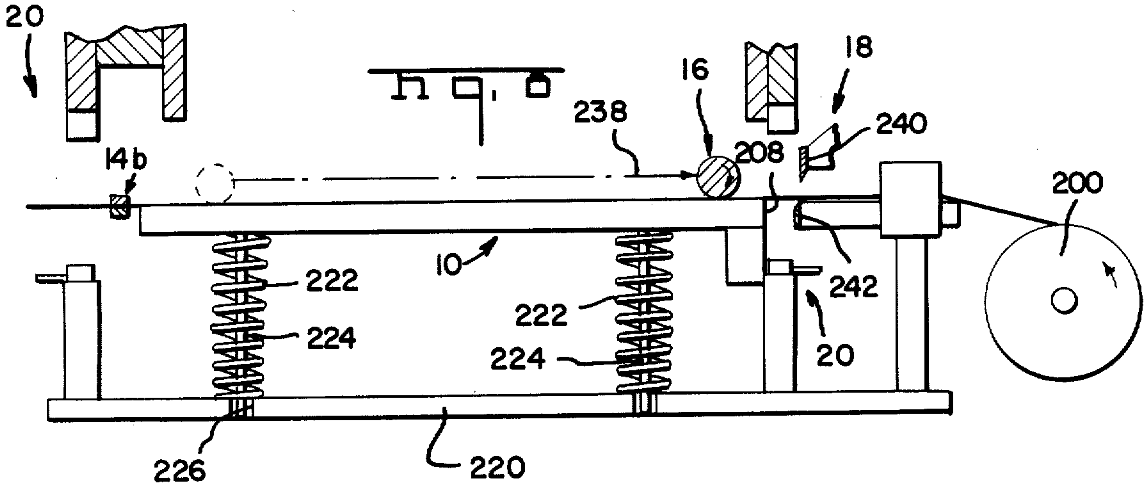
Figure 9:
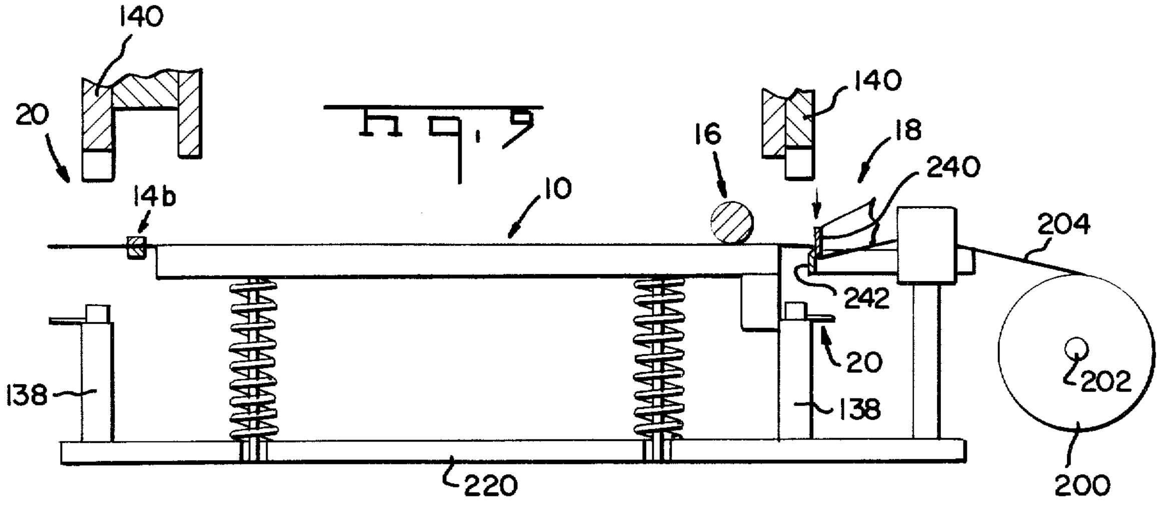
Figure 10:
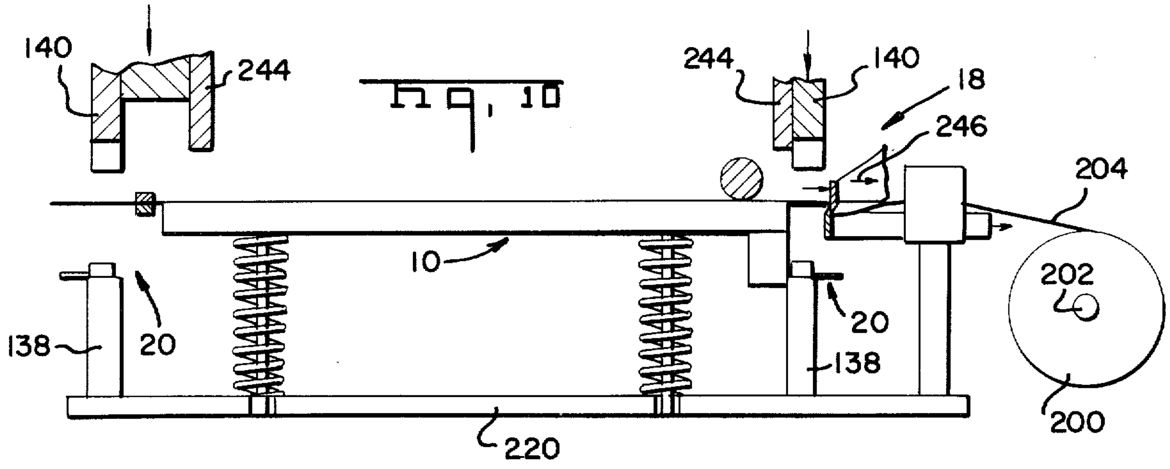
Figure 11:
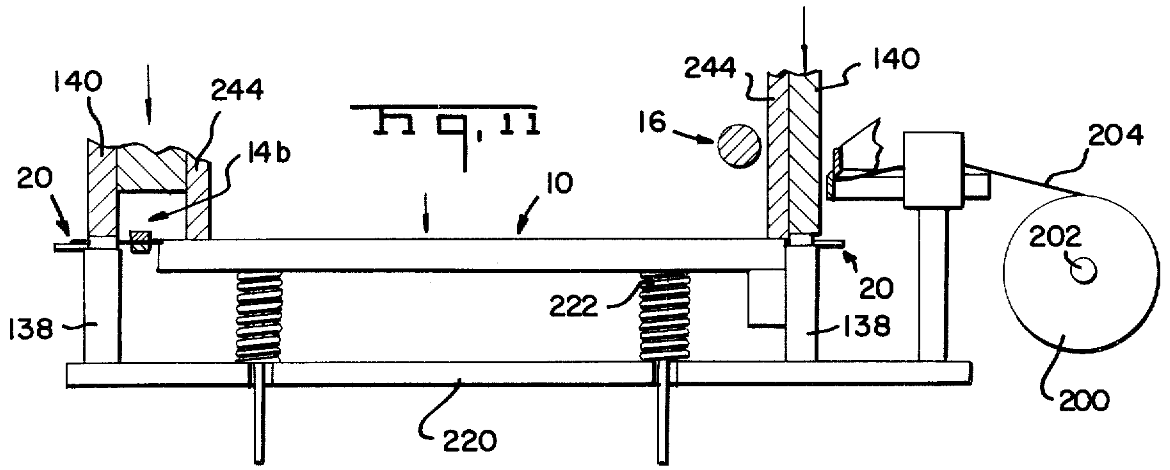

The second embodiment, which is shown in FIGS. 4 through 11, also includes, as previously noted, template means 10 having grooves 12 of varying overall lengths, holding means 14*b*, means to position leads within the grooves of differing lengths, lead trimming means 18 and terminal applying means 20. The leads which are to be disposed in the grooves of varying lengths are initially mounted on a plurality of supply spools 200, the spools being journaled about a support shaft 202. Portions of the leads 204 extend through spaced apart apertures in a wire guide block 206. Before the start of each cycle of the apparatus shown in FIGS. 4 to 11 the leads 204 are trimmed in a common plane which lies parallel to the wire guide block 206 and one end 208 of a template 210, the wire trim line being indicated by the broken line 212. At the start of the operation of the apparatus shown in FIGS. 4 through 11 the end portions of the leads are initially engaged by lead engaging and holding means 18 which includes upper and lower spaced apart jaws 214, 216, respectively. The two jaws are pivoted with respect to each other and are swung to an open position and then brought to a position wherein the end portions of the leads 204 lie between the jaws, at which time the jaws 214, 216 are closed to then securely engage and hold the end portions of the leads. After the end portions of the leads have been initially engaged by the lead engaging and holding means 18, the jaws 214, 216, while still in their closed position are caused to move across the template 210 from said one end 208 to the other end 218 to the position indicated by the broken line 214, 216 in FIG. 4. This sequence of operations is also shown in FIGS. 5 and 6, FIG. 5 showing the initial engaging position of the jaws 214, 216, and FIG. 6 showing the upper and lower jaws 214, 216 after they have pulled the end portion of the leads across the template 210. It should be noted that other portions of the leads 204 extend from the jaws 214, 216 back to the wire guide box 206 and these portions overlie the template 210. The template means 210 is mounted above a support surface by a plurality of springs 222 which are disposed about vertically extending rods 224. Each of the rods 224 ia adapted to pass through a corresponding aperture 226 in the support surface 220. The wire guide block 206 is also secured to the support surface 220 by a mounting member 228. When the lead engaging and holding means initially engage the end portions of the leads and move the end portions across the template, the template is disposed in a somewhat lowered position. (This means for holding the template 210 in a somewhat lowered position are not illustrated in these drawings and are not a material part of this invention). After the end portions of the leads have been moved across the template 210 by the jaws 214, 216 the template is moved upwardly as indicated by the arrows 230 in FIG. 7. It should be noted that as the jaws 214, 216 initially engage the end portions of the leads immediately adjacent the wire guide block 206 that the leads engaged by the jaws will be held in a predetermined fixed relationship to each other. Therefore, as the template 230 moves up as indicated in FIG. 7 that portion of the leads immediately adjacent the jaws 214, 216 will be positioned in the ends of a plurality of spaced apart grooves 232, the grooves 232 being of differing overall length as can be appreciated from an inspection of FIG. 4. After the ends of the leads have been positioned in the ends of the grooves 234 adjacent the ends 218 of the template 210, the positioning means 16 is caused to be operated. The positioning means 16 includes a roller 234, means operable to bias the roller 234 into engagement with the template, the biasing means being indicated by the arrow 236 (FIG. 7), and further means indicated by the arrow 238 (FIG. 8) operable to cause the roller to move from the ends of the grooves adjacent the end 218 of the template to the other ends of the grooves adjacent the end 208 of the template. As the roller moves from one end to the other of the template, the leads 204 which overlie the template will be progressively forced into the plurality of grooves 232 on the upper surface of the template 10. After the roller has moved to the end 208 of the template means 210, the lead trimming means 18 will be brought into operation. The lead trimming means include an upper movable shear blade 240 and a lower movable shear blade 242. The lower movable shear blade 242 is initially held in a lower position as indicated in FIGS. 5 and 6 but is moved to its raised position by means indicated by arrow 243 in FIG. 7 as the template 210 is moved upwardly. To shear the leads it is then only necessary, while the lower shear blade 242 is held in its raised position, to move the upper shear blade 240 downwardly from its raised position shown in FIG. 8 to its shearing position shown in FIG. 9. As the shear blade 240 moves downwardly it will shear the leads 204 along the wire trim line indicated at 212. It should be noted at this point that as the wire trim line is parallel to the end of the template 208 that the trimmed portion of the leads which extend from the jaws 214, 216 to the trim line 212 will be of differing overall length. After the leads 204 have been trimmed to varying lengths it may then be desirable to apply terminals to one or the other ends of the assembly of trimmed leads 204. If terminals are to be applied to both ends, the terminals 142 are supported by anvil means 138 at either end of the template, the anvil forming part of the terminal applying means. Crimper means 140 are then moved downwardly to crimp the spaced apart sidewalls of the terminals about the ends of the leads which project beyond either end 208, 218 of the template. As the crimper means move downwardly wire clamp plates 244, which are interconnected with each of the crimpers 140, engage the leads adjacent the end of the template and force the template downwardly from the raised position shown in FIG. 10 to a lowered position shown in FIG. 11. As the template attains its lowermost position the terminals are crimped about the ends of the leads. Means indicated by the arrow 246 in FIG. 10 may be provided to shift the shearing means 18 away from the end of the template means 210 as the crimper means move downwardly.

The operation of the apparatus shown in FIGS. 4 through 11 should be apparent from the above.

DETAILED DESCRIPTION AND OPERATION OF THIRD EMBODIMENT

Figure 12:
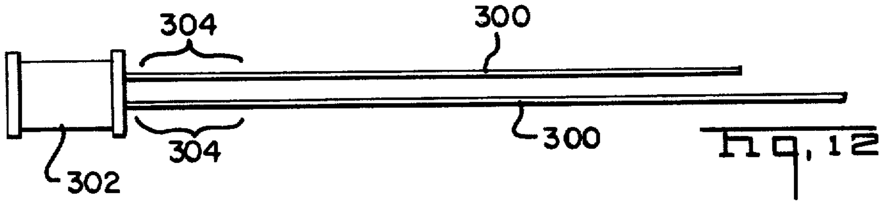
FIG. 12 shows a lead assembly having two leads of initially differing length secured at one end to a common workpiece.
Figure 13:
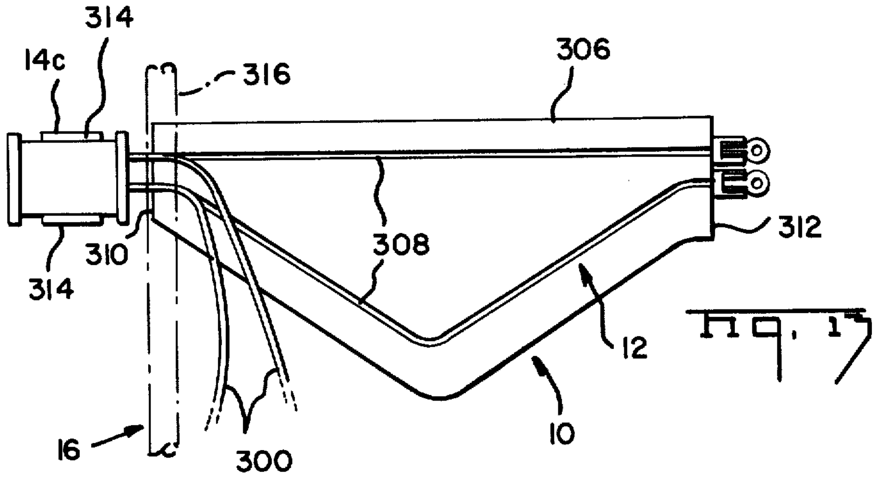
FIG. 13 shows the workpiece of FIG. 12 initially associated with a template having two spaced apart grooves of differing overall lengths.
Figure 14:
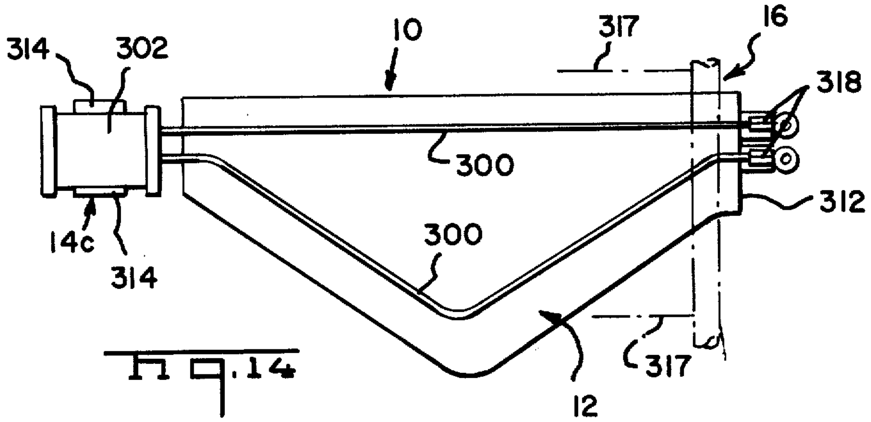
FIG. 14 shows the workpiece of FIG. 12 after its leads have been disposed within the grooves on a template.
Figure 15:
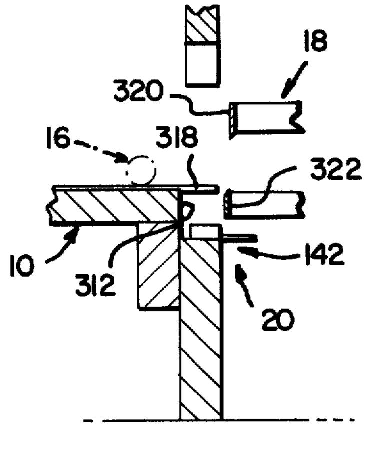
FIG. 15 is a fragmentary side elevation of the apparatus shown in FIGS. 13 and 14 showing how additional operations may be performed upon the ends of the leads.

The apparatus shown in FIGS. 13 through 15 is suitable for use when working with lead assemblies of the type shown in FIG. 12. The lead assembly shown in FIG. 12 includes a plurality of leads 300 which extend outwardly from a common workpiece 302. Portions, indicated by the brackets 304, of the leads immediately adjacent the workpiece are disposed in fixed relationship to each other and are secured to the workpiece. The apparatus includes template means 10 including a template having a plurality of spaced apart grooves 308 which extend from one end 310 of the template means to the other end 312, the grooves being of varying overall length as can be appreciated from an inspection of FIGS. 13 and 14, and each groove being capable of receiving only a single lead 300. Holding means 14c are provided to hold the workpiece 302 adjacent the end 310 of the template means with the fixed portions 304 of the leads 300 being disposed in that portion of the grooves immediately adjacent said one end of the template. The holding means 14c may consist of a pair of clamp members 314. After the workpiece has been disposed in its initial position indicated in FIG. 13 it is then necessary to dispose the leads 300 in the grooves 308 and to this end roller means 316 is biased toward the template to engage the portion 304 of the leads and is then caused to move from the end 310 of the template toward the other end 312 by means indicated by the arrow 317, and as the roller means moves from one end to the other it will position sections of the leads 300 into the plurality of grooves, free end portions 318 of the lead 300 extending beyond the end 312 after the roller means has progressively forced the leads into the spaced apart grooves. After this portion of the operation has been completed subsequent work operations may be performed upon the free end portions 318 of the leads.

The subsequent operations will depend upon the initial configuration of the lead assembly shown in FIG. 12. In one mode of the operation of the apparatus of FIGS. 13 through 15 the lead assembly will have leads which are matched to the length of the grooves 308, and if this is the case, then, after the leads have been positioned in the grooves, each lead will then have a fixed incremental length or free end portion extending beyond the end 312 of the template. If this is the situation then it will not be necessary to shear the ends of the leads but it will be possible to simultaneously affix terminals to the ends of the leads of an assembly which initially has leads of varying lengths. For example, when manufacturing coils for telephone sets it is disirable to have two leads 300 extending outwardly from the coil 302 and to apply terminals to the ends of the leads, the final length of the leads being of differing overall length. If the initial workpiece had leads of the same length, then it would be necessary to trim away portions of the leads. As it may be desirable to manufacture as many as ten million coils in a year this would amount to a considerable waste of material. Therefore, it is desirable to initially affix leads 300 to a coil wherein the leads are of differing lengths and to then apply terminals to the ends of the leads. In order to advantageously simultaneously apply terminals to the ends of the leads at the same time it is necessary that the ends of the leads be positioned in a common plane in the manner indicated in FIG. 14. Thus, once the terminal end portions of the leads have been so positioned it is only necessary to crimp terminals 142 about the terminal end portion 318 of the leads and the manner of doing this has been fully disclosed in connection with the above two embodiments.

However, if the leads are of initially the same length it is then necessary to initially trim the ends of the leads and this may be done by a lead trimming means 18 having upper and lower shear blades 320, 322. The manner of operating the lead trimming means 18 should be apparent from the discussion of the preceding embodiments since the same form of lead trimming means is contemplated in this embodiment.

SUMMARY

While three different forms of apparatus have been disclosed for varying the length of a plurality of leads with respect to each other it should be noted that other forms of apparatus may be employed for differing situations. Therefore, while the preferred structure in which the principle of the present invention have been incorporated are shown and described above, it is to be understood that this invention is not to be limited to the particular details shown and described above, but that, in fact, widely different means may be employed in the broader aspects of this invention.

What is claimed is:

1. A method of varying the relative length of a plurality of leads, comprising the steps of:

providing an apparatus including a template having a plurality of spaced apart grooves, each groove having spaced apart first and second portions;

holding portions of the plurality of leads in fixed relationship to each other adjacent the first portion of the grooves;

positioning portions of the leads which extend away from the held portions of the leads in said plurality of grooves with said positioned portions extending between said first and second portions of the grooves; and varying the relative length of the leads which extend away from the held portions of said leads between the first and second portions of the grooves while holding the leads and maintaining portions of said plurality of leads in said second portions of said plurality of said grooves.

2. A method of varying the relative length of a plurality of leads, comprising the steps of:

providing a template having a plurality of spaced apart grooves, each groove being capable of receiving only a single lead;

holding portions of the plurality of leads in fixed relationship to each other;

positioning portions of the leads which extend away from the held portions of the leads in said plurality of grooves; and trimming said portions of the leads which extend away from the held portions of said leads to varying lengths while maintaining at least a portion of said leads in said plurality of grooves.

3. A method of varying the relative length of a plurality of leads comprising the steps of:

providing a template having a plurality of spaced apart grooves of differing overall length, each groove being capable of receiving only a single lead;

holding portions of the leads in fixed relationship to each other adjacent one end of the grooves;

disposing portions of the leads which extend away from the held portions of the leads over said grooves;

applying a compressive force to said portions over said grooves and moving the compressive force from one end of said grooves to the other end to progressively position said portions of the leads into said grooves; and trimming said leads in a common plane adjacent the other end of the grooves whereby the overall length of the leads between the held portions and the trimmed portions are varied.

4. The method as set forth in claim 3 in which one of said plurality of grooves is generally straight and another of said plurality of grooves is of generally sinosoidal configuration.

5. The method as set forth in claim 3 further characterized by the step of affixing terminals or the like to the leads adjacent those portions which have been trimmed.

6. A method of varying the relative length of a plurality of leads having free end sections which extend away from an end of a multi-lead cable, comprising the steps of:

providing a template having a primary groove and a plurality of secondary grooves emanating from the primary groove, the secondary grooves terminating adjacent one end of the template and being of varying overall length;

holding said end of the multi-lead cable in said primary groove with the free end sections overlying said plurality of secondary grooves;

positioning the free end sections of the leads into said secondary grooves; and trimming the ends of the free end sections adjacent that end of the template where the secondary grooves terminate whereby the relative length of the free end sections are varied.

7. A method comprising the steps of:

providing a template having a plurality of spaced apart grooves of varying overall length which extend from one end of the template to the other;

holding portions of a plurality of leads adjacent one end of the template with other portions of the leads overlying said template, the portions of the leads adjacent said one end of the template being in predetermined relative position to each other and to the plurality of grooves;

positioning portions of the leads which overly the template into said grooves; and subsequently performing substantially simultaneous work operations upon the leads adjacent the other end of said template.

8. The method set forth in claim 7 wherein said work operations includes the step of trimming the leads adjacent the other end of the template whereby the length of the leads between the ends of the template are varied.

9. The method as set forth in claim 8 further characterized by the step of affixing terminals to the leads adjacent the ends of the trimmed leads.

10. A method of making a plurality of leads of varying relative lengths from a plurality of leads mounted on individual supply spools comprising the steps of:

providing a template having a plurality of spaced apart grooves which extend from one end of the template to the other end, the grooves being of different relative overall lengths, and one end of said template being disposed adjacent a plurality of supply spools;

engaging the ends of the leads mounted on said plurality of supply spools and moving the ends across the template from said one end of the template to the other end with portions of the leads which extend away from the ends of the leads overlying said template, holding the ends of the leads moved across the template in fixed positions with respect to portions of the grooves adjacent said other end of the template;

progressively positioning the portions of the leads which overlie said template into said plurality of grooves by applying a compressive force to said portions of the leads and moving the compressive force from said other end of the template to the end of the template adjacent said supply spools; and trimming the leads adjacent that end of the template which is disposed adjacent the supply spools.

11. The method set forth in claim 10 further characterized by the step of applying terminals to the ends of the leads adjacent that portion of the leads which have been trimmed.

12. A method for performing work operations upon free end portions of a plurality of leads which are secured at their other end to a common work piece in a fixed spacial relationship to each other, said method comprising the steps of:

providing a template having a plurality of spaced apart grooves of differing lengths, the grooves extending from one end of the template to the other;

holding the work piece adjacent one end of said template with portions of the leads overlying said plurality of spaced apart grooves;

positioning said portions of said leads in said plurality of spaced apart grooves with free end portions of the leads extending beyond the other end of the template; and performing substantially simultaneous work operations upon the free end portions of the leads which extend beyond the other end of the template.

13. The method set forth in claim 12 in which the step of performing substantially simultaneous work operations includes the step of trimming the ends of the free end portions in a common plane whereby the overall length of the leads is varied.

14. A method of simultaneously affixing terminals or the like to a plurality of leads of differing lengths which extend away from a common work piece comprising the steps of:

providing a template haivng spaced apart ends and a plurality of grooves equal in number to the plurality of leads which extend away from the work piece, the grooves extending from one end of the template to the other end and being of differing overall length, and each groove being of a length which is a fixed length less than that of the lead which is to be associated with said groove;

holding the work piece adjacent said one end of said template with portions of the leads overlying the template;

applying a progressive compressive force to said leads from said one end of the template adjacent the work piece to the other end to progressively position said plurality of leads into said plurality of associated grooves with free end portions of said leads extending beyond said other end of the template, said free end portions being of substantially the same length; and simultaneously applying terminals or the like to the free end portions of said leads.

15. An apparatus for varying the relative length of a plurality of leads comprising:

template means having a plurality of spaced apart grooves, each groove being capable of receiving only a single lead;
positioning means operable to position a section of each of a plurality of leads in said plurality of grooves; and
lead trimming means operable to trim said leads to varying lengths while at least portions of said sections are disposed in said plurality of grooves.

16. The apparatus as set forth in claim 15 wherein the means to trim said leads to varying lengths include a shear bar which trims the ends of the leads in a common plane.

17. The apparatus set forth in claim 15 further characterized by the provision of terminal applying means operable to affix terminals to the ends of the leads adjacent that portion which has been trimmed.

18. The apparatus as set forth in claim 15 wherein the positioning means includes a force applying means biased toward the template means, and means operable to cause said force applying means to move from one end of the plurality of spaced apart grooves to the other end of said grooves.

19. An apparatus suitable for varying the relative length of a plurality of leads comprising:
template means having a plurality of spaced apart grooves of differing overall lengths, each groove being capable of receiving only a single lead;
holding means operable to hold a portion of a plurality of leads adjacent one end of said grooves;
positioning means operable to position sections of said plurality of leads in said plurality of grooves whereby the sections of said leads positioned in the grooves extend from said one end of the grooves to the other end and are of differing overall length with respect to each other; and
means operable to perform subsequent work operations upon the leads adjacent the other end of said grooves.

20. The apparatus as set forth in claim 19 in which said last mentioned means is lead trimming means operable to trim said plurality of leads in a common plane.

21. The apparatus as set forth in claim 19 in which one or more of said plurality of grooves are generally straight and in which the other grooves of said plurality of grooves are of a generally sinusoidal configuration.

22. The apparatus as set forth in claim 19 in which the positioning means includes a roller, means operable to bias said roller toward said template means, and means operable to move said roller from one end of the grooves to the other end of said grooves while the roller is being biased toward the said template means.

23. An apparatus for varying the relative length of a plurality of leads having free end lead sections which extend away from an end of a multi-lead cable, said apparatus comprising:
template means having a primary groove and a plurality of secondary grooves emanating from the primary groove, the secondary grooves terminating adjacent one end of the template means and being of varying overall length;
holding means operable to hold said end of the multi-lead cable in said primary groove;
positioning means operable to position portions of the free end sections into said secondary grooves with free end portions extending beyond said one end of the template means; and
lead trimming means operable to trim ends of the free end portions to thereby vary the relative length of the free end sections.

24. An apparatus adapted to perform simultaneous work operations upon the free end portions of a plurality of leads which extend outwardly from a common workpiece, said apparatus comprising:
template means having a plurality of spaced apart grooves of varying overall length, said grooves extending from one end of the template means to the other end;
holding means operable to hold said workpiece adjacent one end of said template means with at least a portion of said leads adjacent the workpiece being in operable association with a portion of the grooves adjacent said one end of the template means;
positioning means operable to position said plurality of leads into said plurality of grooves with portions of said leads extending from one end of said template means to the other end and with free end portions of the leads extending beyond the other end of the template means; and
means operable to perform a subsequent work operation upon the free end portions of the leads adjacent the other end of said template.

25. The apparatus as set forth in claim 24 wherein said last mentioned means includes terminal applying means.

26. The apparatus as set forth in claim 24 wherein said last mentioned means includes lead trimming means.

27. An apparatus for assembling a plurality of leads of varying relative lengths from a plurality of leads mounted on individual supply spools, said apparatus comprising:
template means having a plurality of spaced apart grooves which extend from one end of the template to the other end, the grooves being of different relative overall lengths;
guide means operable to support the ends of a plurality of leads which extend away from a plurality of individual supply spools, the ends being initially disposed in a common plane adjacent one end of the template means;
lead engaging and holding means operable to engage the ends of the leads and to move the ends of the leads away from said common plane across the template means to the other end of the template means with portions of the leads which extend away from the ends overlying said template means, said lead engaging and holding means also being operable to hold the ends of the leads moved across the template in fixed positions with respect to portions of the grooves adjacent said other end of the template means;
positioning means operable to position the portions of the leads which overlie said template means into said plurality of spaced apart grooves; and
lead trimming means operable to trim the leads adjacent said one end of the template, the trimmed ends of the leads being disposed in said common plane.

* * * * *